US009004593B2

(12) United States Patent
Banghart et al.

(10) Patent No.: US 9,004,593 B2
(45) Date of Patent: *Apr. 14, 2015

(54) CHILD CARRIER RESTRAINT SYSTEM (71) Applicant: Seatcure, LLC, Windsor, CO (US)

(72) Inventors: Karin J. Banghart, Windsor, CO (US);
Tye L. Banghart, Windsor, CO (US)

(73) Assignee: Seatcure, LLC, Windsor, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/451,205

(22) Filed: Aug. 4, 2014

(65) Prior Publication Data

US 2014/0338176 A1    Nov. 20, 2014

Related U.S. Application Data (62) Division of application No. 13/884,921, filed as application No. PCT/US2012/067128 on Nov. 29, 2012, now Pat. No. 8,827,364.

(60) Provisional application No. 61/629,896, filed on Nov. 30, 2011.

(51) Int. Cl.
A47C 1/08    (2006.01)
A47D 1/10    (2006.01)
B60N 2/28    (2006.01)

(52) U.S. Cl.
CPC ............ B60N 2/2863 (2013.01); B60N 2/2887 (2013.01); B60N 2/286 (2013.01); B60N 2/28 (2013.01); B60N 2/286 (2013.01)

(58) Field of Classification Search
CPC ...... B60N 2/2863; B60N 2/2887; B60N 2/28; B60N 2/265; B60N 2/2806

USPC .......................... 297/256.16, 253, 250.1, 468
See application file for complete search history.

(56) References Cited

U.S. PATENT DOCUMENTS

| | | |
|---|---|---|
| 5,342,111 A | 8/1994 | Charles |
| D379,495 S | 5/1997 | Sidman et al. |
| 5,695,243 A | 12/1997 | Anthony et al. |
| 5,779,319 A | 7/1998 | Merrick |
| D403,719 S | 1/1999 | Smith, II et al. |
| 5,927,661 A | 7/1999 | Tinsley et al. |
| 5,934,747 A | 8/1999 | Garland |

(Continued)

FOREIGN PATENT DOCUMENTS

| | | |
|---|---|---|
| EP | 560184 | 9/1993 |
| EP | 1300280 | 4/2003 |

(Continued)

OTHER PUBLICATIONS

PCT Interantional Patent Application No. PCT/US2012/067128, Nov. 29, 2012.

(Continued)

Primary Examiner — Chi Q Nguyen
(74) Attorney, Agent, or Firm — Craig R. Miles; CR Miles, P.C.

(57) ABSTRACT

A child carrier having a carrier pass through which defines a restraint path between opposed carrier sides and having a carrier restraint tensioner coupled at a fixed location on the child carrier which operates to adjust length of a carrier restraint disposed in the restraint path to secure the child carrier in relation to a vehicle seat.

18 Claims, 7 Drawing Sheets

(56) References Cited

U.S. PATENT DOCUMENTS

| | | | |
|---|---|---|---|
| 6,016,926 A | 1/2000 | Smith, II et al. |
| 6,026,528 A | 2/2000 | Pina |
| 6,047,451 A | 4/2000 | Berger et al. |
| 6,105,211 A | 8/2000 | Berger |
| 6,209,957 B1 | 4/2001 | Baloga et al. |
| 6,378,940 B1 | 4/2002 | Longoria et al. |
| 6,431,646 B1 | 8/2002 | Longoria |
| 6,592,183 B2 | 7/2003 | Kain |
| 6,601,917 B1 | 8/2003 | Christopherson |
| 6,725,476 B2 | 4/2004 | Macari |
| 6,764,135 B2 | 7/2004 | Sasaki et al. |
| 6,820,310 B2 | 11/2004 | Woodard et al. |
| 6,947,071 B2 | 9/2005 | Eichmann |
| 6,959,463 B2 | 11/2005 | Macari |
| 7,044,548 B2 | 5/2006 | Mullen et al. |
| 7,055,193 B2 | 6/2006 | Macari et al. |
| 7,077,475 B2 | 7/2006 | Boyle |
| 7,080,419 B2 | 7/2006 | Macari |
| 7,150,053 B2 | 12/2006 | Macari |
| 7,159,948 B1 * | 1/2007 | Wolf ........................ 297/463.1 |
| 7,168,762 B2 | 1/2007 | Maciejczyk |
| D537,337 S | 2/2007 | Brockington et al. |
| 7,246,854 B2 | 7/2007 | Dingman et al. |
| 7,251,334 B1 | 7/2007 | Sunberg |
| 7,329,192 B2 | 2/2008 | Gibree |
| 7,347,494 B2 | 3/2008 | Boyle et al. |
| 7,422,283 B2 | 9/2008 | Patterson et al. |
| 7,454,804 B2 | 11/2008 | Macari et al. |
| 7,757,320 B2 | 7/2010 | Lord et al. |
| 7,878,588 B2 | 2/2011 | Snedeker |
| 7,886,384 B2 | 2/2011 | Lord |
| 7,887,129 B2 | 2/2011 | Hei et al. |
| 7,918,497 B2 | 4/2011 | Keegan |
| D644,259 S | 8/2011 | Barley et al. |
| 8,141,950 B2 | 3/2012 | Boyer |
| 8,256,840 B2 | 9/2012 | Dasent et al. |
| 8,262,161 B2 * | 9/2012 | Fritz et al. ..................... 297/253 |
| 8,313,142 B2 | 11/2012 | Xiao |
| 8,444,222 B2 | 5/2013 | Buckingham et al. |
| 8,827,364 B2 * | 9/2014 | Banghart ..................... 297/253 |
| 2003/0030311 A1 * | 2/2003 | Woodard et al. ........... 297/250.1 |
| 2003/0071511 A1 | 4/2003 | Stafford et al. |
| 2003/0193226 A1 | 10/2003 | Kain |
| 2004/0174055 A1 | 9/2004 | Abel |
| 2006/0181123 A1 | 8/2006 | Gibree |
| 2007/0156060 A1 | 7/2007 | Servantes |
| 2007/0175382 A1 | 8/2007 | Warner |
| 2008/0302680 A1 | 12/2008 | Lord |
| 2009/0151080 A1 | 6/2009 | Lord |
| 2009/0217458 A1 | 9/2009 | Lord |
| 2010/0038954 A1 | 2/2010 | Chen et al. |
| 2010/0256529 A1 | 10/2010 | Grasing et al. |
| 2011/0057489 A1 | 3/2011 | Greene |
| 2011/0089726 A1 | 4/2011 | Gibree |
| 2011/0089729 A1 | 4/2011 | Gibree |
| 2011/0089731 A1 | 4/2011 | Gibree |
| 2012/0104815 A1 | 5/2012 | Miller et al. |
| 2012/0126597 A1 | 5/2012 | Hall et al. |
| 2014/0062151 A1 | 3/2014 | Banghart et al. |

FOREIGN PATENT DOCUMENTS

| | | |
|---|---|---|
| JP | 2001-253277 | 9/2001 |
| JP | 2002-002347 | 1/2002 |

OTHER PUBLICATIONS

U.S. Appl. No. 61/629,896, filed Nov. 30, 2011.

Summer Infant. Prodigy™ Infant Car Seat Base (Bronze). On-line catalog, http://www.summerinfant.com, originally downloaded Nov. 15, 2012, 1 page.

* cited by examiner

CHILD CARRIER RESTRAINT SYSTEM

This United States Patent Application is a division of U.S. patent application Ser. No. 13/884,921, filed May 10, 2013, now U.S. Pat. No. 8,827,364, issued Sep. 9, 2014, which is the United States National Stage of International Patent Cooperation Treaty Patent Application No. PCT/US2012/067128, filed Nov. 29, 2012, which claims the benefit of U.S. Provisional Patent Application No. 61/629,896, filed Nov. 30, 2011, each hereby incorporated by reference herein.

I. TECHNICAL FIELD

A child carrier having a carrier pass through which defines a restraint path between opposed carrier sides and having a carrier restraint tensioner coupled at a fixed location on the child carrier which operates to adjust length of a carrier restraint disposed in the restraint path to secure the child carrier in relation to a vehicle seat.

II. BACKGROUND

There can be great difficulty in installing conventional child car seats (also known as infant carriers, child car seats, child seats, or the like, collectively referred to as "child car seat" or "child car seats") into vehicles. Generally, this is due to the almost limitless variation in the structure and method of manufacture of conventional child car seats, vehicle seats, and vehicle seat belts.

Getting a good fit between a conventional child car seat and a vehicle seat can be more difficult than manufacturers admit due to any one or a combination of factors. For example, conventional vehicle seatbelts may have automatic locking retractors (ALR), or emergency locking retractors (ELR) or seatbelts that switch between the two. Most new cars' middle seats have shoulder belts, some older ones don't, but all models post 2008 will. Additionally, vehicle seats can have cushions that may be flat or rounded, wide or narrow. Add to this the wide array of dimensions and configurations utilized in the manufacture of conventional child car seats, and the result can be literally thousands of structural combinations to contend with.

To assist the consumer and simplify installation, the federal government required that vehicle seats and most vehicles made after September 2002 feature "lower anchors and tethers for children (also known as "LATCH attachments"). If both the child car seat and vehicle are equipped with LATCH attachments, then there is no need to use the seatbelts to install the child carrier. However, LATCH attachments create a unique set of problems, and not all LATCH child car seats will fit into all vehicles fitted with LATCH attachments, or can fit improperly, or not secure tightly.

Typically, in securing a conventional child seat in the rear-facing condition using standard shoulder and lap belts without LATCH attachments, the vehicle's lap and shoulder belt is threaded through a "belt path" of the child car seat. The latch plate (male end of the seatbelt) may then be inserted into the buckle (female end), then, the installer places a knee in the child seat. Using the installer's full weight on the child car seat to fully compress the vehicle seat, the seat belt is pulled to tighten the seat belt within the belt path of the child car seat. The installer may have to bounce down on the child car seat a few times to achieve the recommended amount of slack in the tightened belt. A similar procedure can be utilized to secure a conventional child car seat in the forward-facing condition to the vehicle seat.

Typically, to secure a child car seat having LATCH attachments in the rear-facing condition to the vehicle seat, the LATCH attachment furthest away from the installer can be hooked onto the corresponding lower anchor of the vehicle seat. The installer may then place a knee on top of the child car seat. Using the installer's full weight to fully compress the vehicle seat, the other LATCH attachment can then be hooked to the other anchor of the vehicle seat and the slack in the belt between the two anchors can be pulled out. The knee can then be removed from the child car seat allowing the vehicle seat to return to a normal uncompressed condition and the child car seat may or may not be firmly secured in relation to the vehicle seat. A similar procedure can be utilized to secure a child car seat having LATCH attachments in the forward-facing condition to the seat of a vehicle.

Regardless of the conventional apparatus and methods used to secure a conventional child car seat to a vehicle seat the prominent problem common to most installations can be insufficient shortening of the seat belt or that direction of forces generated by shorting the seat belt within the belt path result in substantial net forces that allow excessive movement of the child car seat in relation to the vehicle seat.

There would be advantages in an inventive child carrier restraint system and methods of using a child carrier restraint system which provides a solution to each of the above-described problems.

III. DISCLOSURE OF INVENTION

Accordingly, a broad object of the invention can be to provide a child carrier having a carrier pass through which defines a restraint path between opposed carrier sides and having a carrier restraint tensioner coupled at a fixed location on the child carrier which operates to adjust length of a carrier restraint disposed in the restraint path having a first carrier restraint end and a second carrier restraint end correspondingly coupled to a first lower latch anchor and a second lower latch anchor of a vehicle seat to secure the child carrier, without excessive movement, in relation to a vehicle seat.

Another substantial object of the invention can be to provide a child carrier having one carrier restraint tensioner which removably fixedly couples at a first location on the child carrier to allow installation of the child carrier in the rear-facing condition and which removably fixedly couples at a second location on the child carrier to allow installation of the child carrier in the forward-facing condition, each of the rear-facing condition and the forward-facing condition secured in relation to the vehicle seat by operation of the carrier restraint tensioner coupled at a fixed location on the child carrier which reduces net forces to correspondingly reduce movement of the child carrier during use.

Another substantial object of the invention can be to provide a method of producing a child carrier restraint system including one or more of obtaining a child carrier having a carrier pass through which defines a restraint path between opposed carrier sides; securing a carrier restraint tensioner at a fixed location on the child carrier; and coupling a carrier restraint to the carrier restraint tensioner, whereby the fixed location of the carrier restraint tensioner on the child carrier allows the carrier restraint to be disposed in the restraint path to locate a first carrier restraint end and a second carrier restraint end at the opposed sides of the child carrier for coupling to a first lower latch anchor and second lower latch anchor of a vehicle seat, and whereby operation of the carrier restraint tensioner the carrier restraint in the restraint path shortens to secure the child carrier to the vehicle seat.

Another substantial object of the invention can be to provide a method of restraining a child carrier to a vehicle seat including one or more of obtaining a child carrier having a carrier pass through which defines a restraint path between opposed carrier sides and having a carrier restraint tensioner coupled at a fixed location on the child carrier which operates to adjust length of a carrier restraint having a first carrier restraint end and a second carrier restraint end; positioning the child carrier on a vehicle seat having a first lower latch anchor and second lower latch anchor; establishing the carrier restraint in the restraint path of the carrier pass through to correspondingly locate a first carrier restraint end and a second carrier restraint end at opposed carrier seat sides; correspondingly coupling the first carrier restraint end and the second carrier restraint end to the first lower latch anchor and the second lower latch anchor of the vehicles seat; and operating the carrier restraint tensioner to shorten the carrier restraint established in the restraint path to secure the child carrier seat in relation to the vehicle seat Naturally, further objects of the invention are disclosed throughout other areas of the specification, drawings, photographs, and claims.

V. MODE(S) FOR CARRYING OUT THE INVENTION

A child carrier restraint system (1) which includes, whether individually or in various combinations, a child carrier (2), a carrier restraint tensioner (3) coupled at a fixed location on the child carrier (2), and a carrier restraint (4) coupled to the carrier restraint tensioner (3). Operation of the carrier restraint tensioner (3) adjusts length of the carrier restraint (4) to positionally secure the child carrier (2) to a vehicle seat (5) of a vehicle (6).

Figure 1:
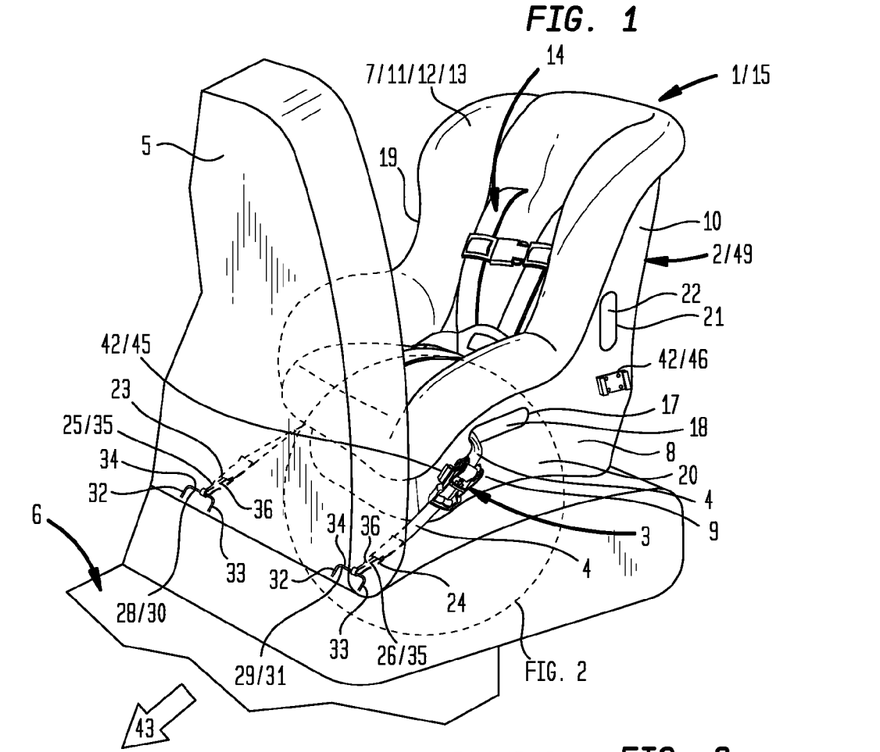
FIG. 1 is an illustration of a particular embodiment of the inventive child carrier having a carrier restraint tensioner and a particular method of installing the inventive child carrier to a vehicle seat in a rear-facing condition.
Figure 3:
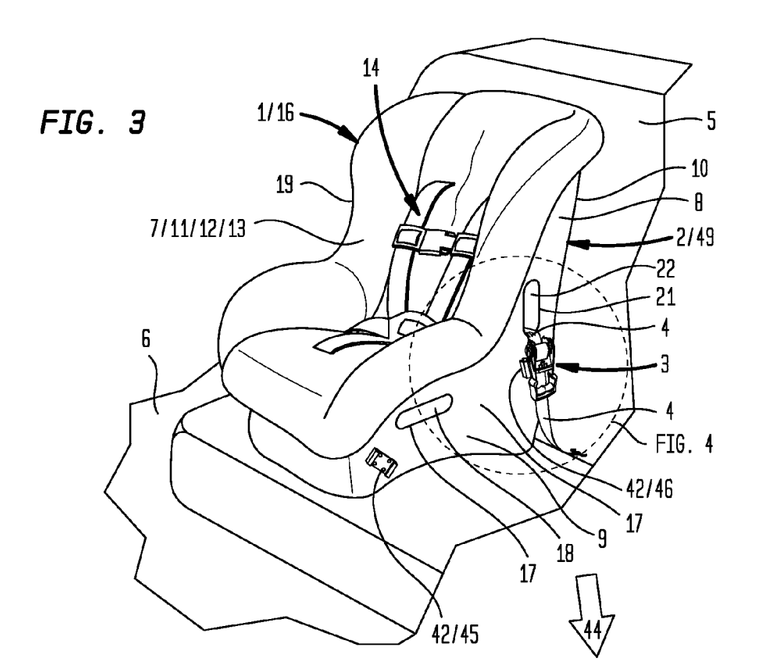
FIG. 3 is an illustration of a particular embodiment of the inventive child carrier having a carrier restraint tensioner and a particular method of installing the inventive child carrier to a vehicle seat in a forward-facing condition.
Figure 9:
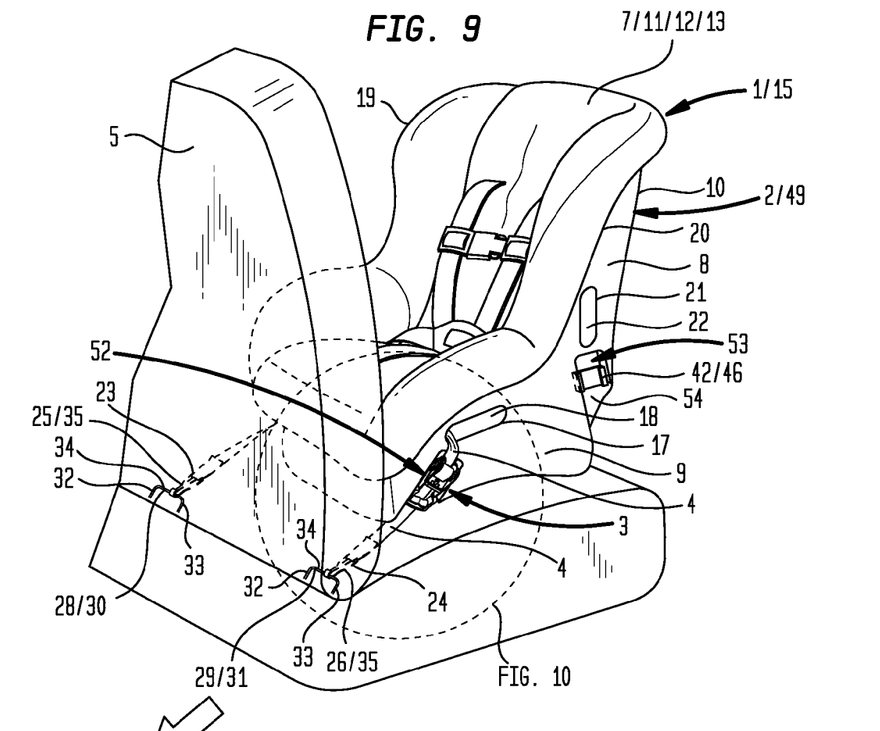
FIG. 9 is an illustration of a particular embodiment the inventive child carrier having a first recess element within which a carrier restraint tensioner has fixed location allowing installation of the inventive child carrier in the rear-facing condition.

Generally as to embodiments of the invention, the child carrier (2) can be formed, molded or otherwise fabricated as a one-piece child carrier from an injection or blow moldable plastic; however, particular embodiments of the child carrier (2) can be produced from a plurality of pieces and the term child carrier (2) is intended to broadly encompass any constructional form suitable for use in accordance with one or more embodiments of the invention. Additionally, while the child carrier (2) will typically have an internal surface (7) and an external surface (8) configured to provide a carrier seat (9) and a carrier back (10) with the internal surface (7) configured to receive a human infant or child (not shown), the internal surface (7) can be configured to receive a non-human animal such as a dog or cat (not shown), or even be configured to receive an inanimate object(s) such as a packages, flowers, construction material, sporting equipment, or the like. A cushion (11) can be engaged with or coupled to the internal surface (7) of the child carrier (2). The cushion (11) can be made from a compressible material (12) such as open cell foam or closed cell foam of urethane, polyethylene, silicone rubber, or the like, or combinations thereof. The compressible material (12) can be overlaid by a cover material (13) such as a plastic sheet of vinyl, polyvinyl chloride, acrylonitrile butadiene styrene, or the like, or a woven fabric of natural or synthetic fibers, such as cotton, wool, rayon, nylon, silk, carbon, or the like. A harness (14) can be coupled to the child carrier (2) to restrain the human, non-human or inanimate object, in relation to the internal surface (7) and as to particular embodiments the harness (14) can be a five point harness which attaches at the shoulders, hips and between the legs of a child or infant (as shown in the examples of FIGS. 1, 3 and 9): however, the invention is not so limited. As to other particular embodiments, the child carrier (2) can be a conventional child carrier (49) having configuration suitable for retrofitting with particular elements as further described below to provide embodiments of the inventive child carrier restraint system (1).

Figure 2:
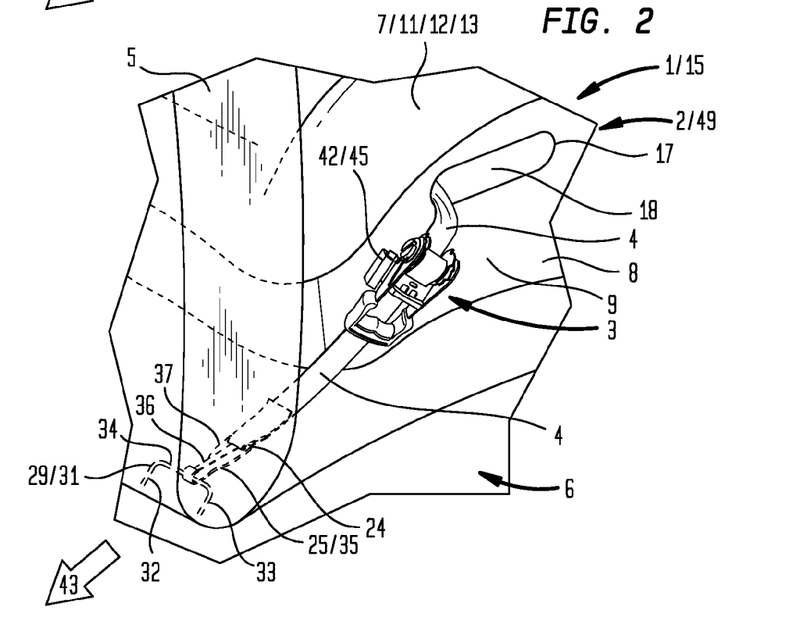
FIG. 2 is an enlarged view of FIG. 1 which shows the carrier restraint tensioner coupled at a fixed location on the child carrier generating sufficient tension on a carrier restraint disposed within a first restraint path of a child carrier to secure the inventive child carrier to the vehicle seat in the rear-facing condition.
Figure 4:
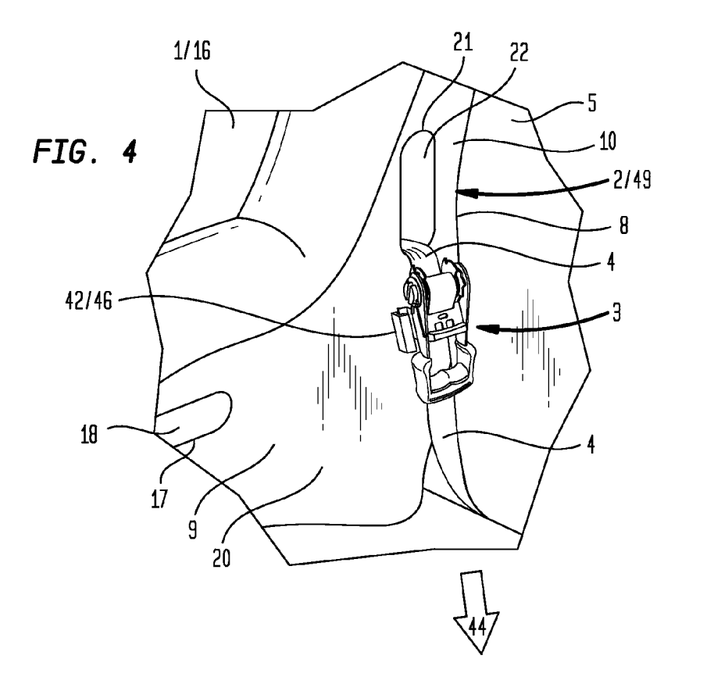
FIG. 4 is an enlarged view of FIG. 3 which shows the carrier restraint tensioner coupled at a fixed location on the child carrier generating sufficient tension on a carrier restraint disposed within a second restraint path of the child carrier to secure the inventive child carrier to the vehicle seat in the forward-facing condition.
Figure 5:
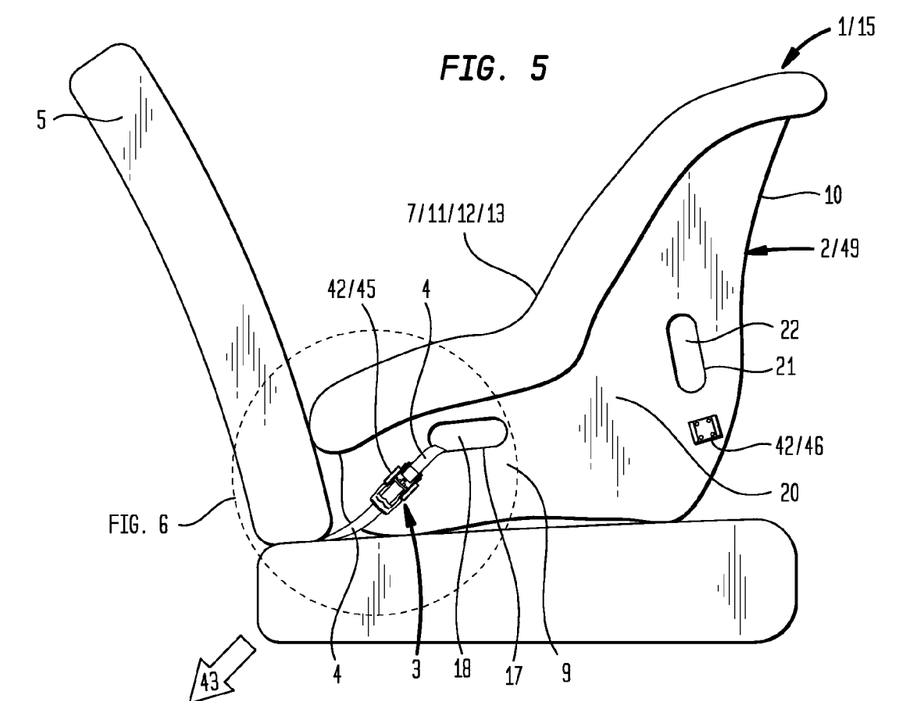
FIG. 5 is a side view of the inventive child carrier having a carrier restraint tensioner secured to a vehicle seat in a rear-facing condition.
Figure 6:
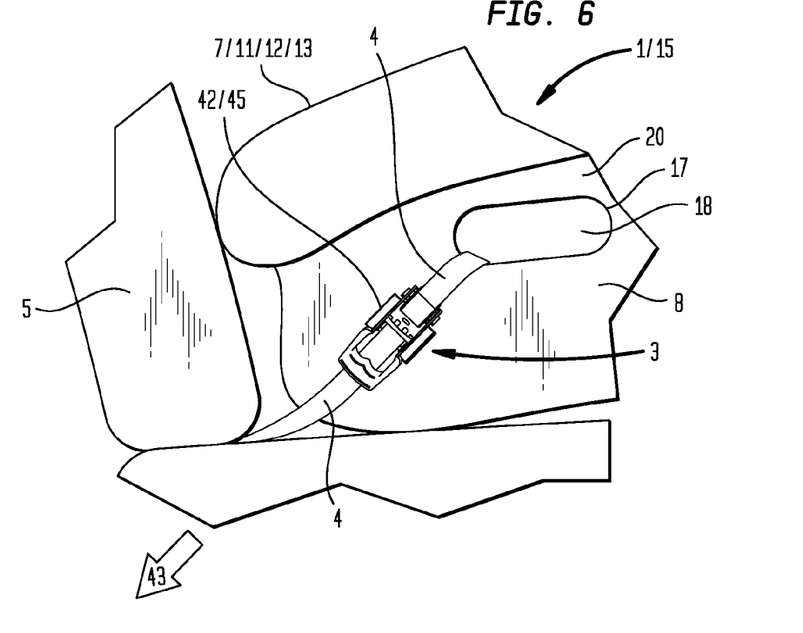
FIG. 6 is an enlarged view of FIG. 5 which shows the carrier restraint tensioner coupled at a fixed location on the child carrier generating sufficient tension on a carrier restraint disposed within a first restraint path of the child carrier to secure the inventive child carrier to the vehicle seat in the forward-facing condition.
Figure 7:
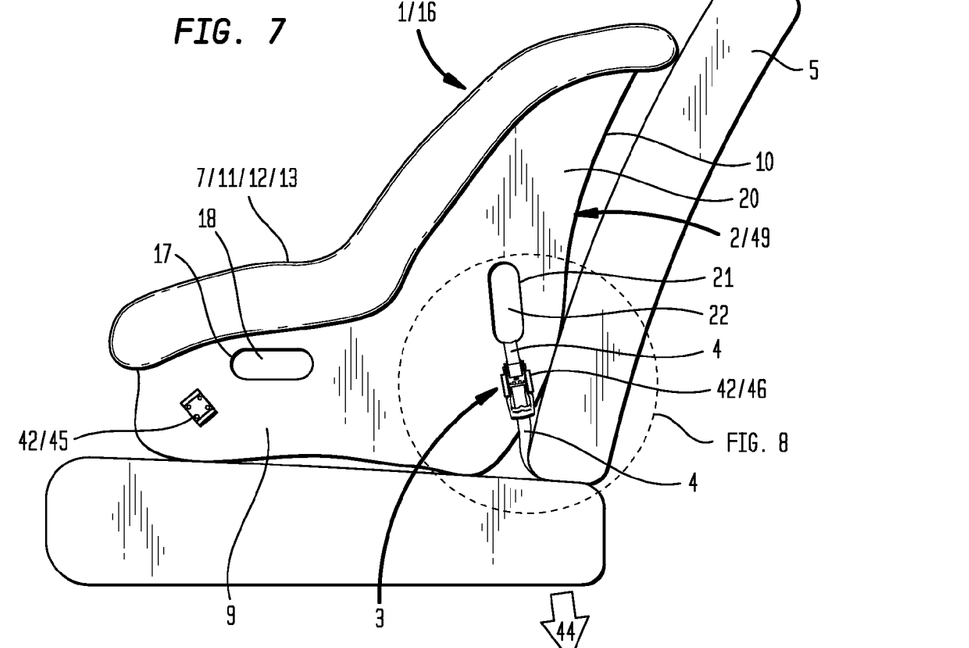
FIG. 7 is a side view of the inventive child carrier having a carrier restraint tensioner secured to a vehicle seat in a forward-facing condition.
Figure 8:
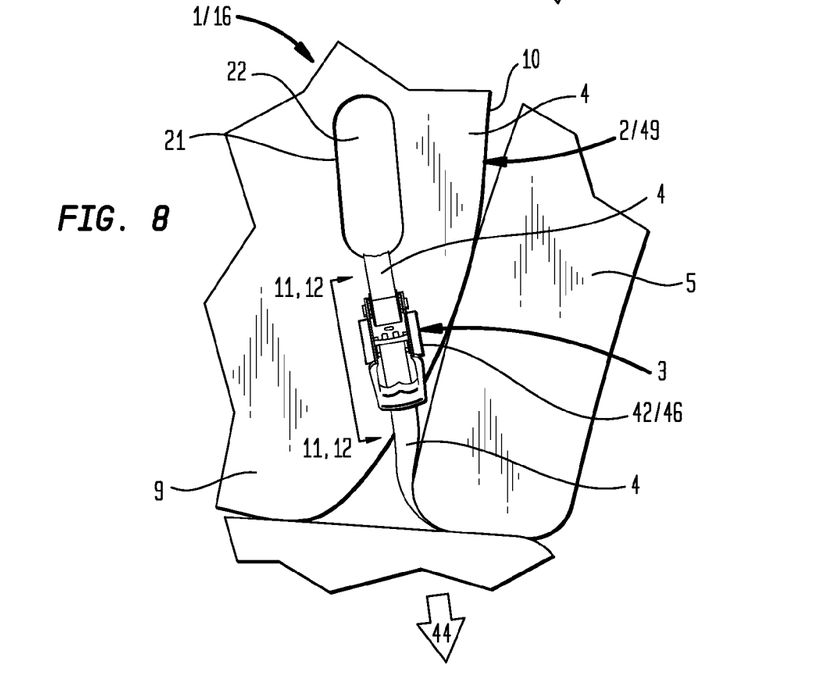
FIG. 8 is an enlarged view of FIG. 7 which shows the carrier restraint tensioner coupled at a fixed location on the child carrier generating sufficient tension on a carrier restraint disposed within a second restraint path of the child carrier to secure the inventive child carrier to the vehicle seat in the forward-facing condition.

Now referring primarily to FIGS. 1-9, particular embodiments of the child carrier restraint system (1) can be adapted or configured for installation in relation to the vehicle seat (5) whether in a rear-facing condition (15) (as shown in the examples of FIGS. 1 and 2) or in a forward-facing condition (16) (as shown in the examples of FIGS. 3 and 4).

Now referring primarily to FIGS. 1-2 and 5-6, particular embodiments of the inventive child carrier restraint system (1) are shown which allow installation of the child carrier (7) in the rear-facing condition (15). As to these embodiments, the child carrier (2) further includes a first carrier pass through (17) which defines a first restraint path (18) which communicates with opposed carrier sides (19)(20) of the carrier seat (9). A carrier restraint (4) can be disposed in the first carrier restraint path (18) (as shown in the example of FIGS. 1 and 2). The carrier restraint (4) can take the form of a belt (as shown in the examples of FIGS. 1-2, 5-6 and 11-12); however, the invention is not so limited, and the carrier restraint (2) can take any form compatible with the constructional form of the carrier restraint tensioner (3) utilized with the embodiments of the invention, as further described below.

Now referring primarily to FIGS. 3-4, and 7-8, particular embodiments of the inventive child carrier restraint system (1) are shown which allow installation of the child carrier (7) in the forward-facing condition (16). As to these embodiments, the child carrier (7) further includes a second carrier pass through (21) which provides a second carrier restraint path (22) which communicates with opposed carrier sides (19)(20) of the carrier back (10). The carrier restraint (4), as above described, can be disposed in the second carrier restraint path (22) (as shown in the example of FIGS. 3 and 4).

Now referring primarily to FIGS. 1, 2, 9 and 10, the carrier restraint (4) can further include at a first carrier restraint end (23) and a second carrier restraint end (24) correspondingly having a first restraint end fastener (25) and a second restraint end fastener (26). As to certain embodiments, the first restraint end fastener (25) and a second restraint end fastener (26) can be configured or adapted to correspondingly couple to a first lower latch anchor (28) and a second lower latch anchor (29). The term "lower latch anchor" for the purposes of the instant invention broadly encompasses anchors inside a vehicle (6) configured or adapted for coupling the end of a seatbelt, harness, or other restraint used to secure an occupant in a vehicle seat (5) against movement that may result during a collision or similar event, whether original to the vehicle (6) in the form of LATCH lower anchors (as shown in the example of FIGS. 1 and 2) which may be spaced between about 11 inches and 20 inches apart depending upon whether the vehicle (6) provides LATCH lower anchors in a middle seating position, or anchors retrofitted to the vehicle seat (5) or the floor of the vehicle (6) capable of coupling the end of a seatbelt, harness, restraint, or the first restraint end fastener (25) and a second restraint end fastener (26) as described herein. As to particular embodiments, the first lower latch anchor (28) and a second lower latch anchor (29) can be in the form of a pair of latch wires (30)(31), each of the pair of latch wires (30)(31) having a pair of legs (32)(33) spatially separated joined at one end by a transverse latch bar (34). The first restraint end fastener (25) and a second restraint end fastener (26) can be correspondingly coupled to the transverse latch bar (34) of the pair of latch wires (30)(31). As shown in the example of FIGS. 1, 2, 9 and 10 the first restraint end fastener (25) and the second restraint end fastener (26) can be in the form of a hook (35) with a safety latch (36) which can couple to the transverse latch bar (34) of each of the pair of latch wires (30)(31) and having a clevis base (37) or similar type base to which the first carrier restraint end (23) and the second carrier restraint end (24) can correspondingly couple by wrapping the restraint ends (23)(24) about the clevis base (37) and securing the restraint ends (23)(24) in secured overlaid engagement by stitches, adhesives, or heat welding, or the like. The examples of FIGS. 1, 2, 9 and 10 are intended to be illustrative of the numerous and varied mechanical fasteners, such as latches, catches, or the like which can be used to removably couple the restraint ends (23)(24) to the respective first and second lower latch anchors (28)(29).

Accordingly, embodiments of the child carrier restraint system (1) can be installed by coupling a first carrier restraint end fastener (26) to a first latch lower anchor (28) on a first of the opposed carrier sides (19) and a second carrier restraint end fastener (27) to a second latch lower anchor (29) on a second of the opposed carrier sides (20). The carrier restraint (4) passed through the first carrier restraint path (18) and coupled by the first and second carrier restraint end fasteners (26)(27) to the corresponding first and second latch lower anchors (28)(29) allows the inventive child carrier (2) to be disposed in the rear-facing condition (15) (as shown in the examples of FIGS. 1 and 2). The carrier restraint (4) passed through the second carrier restraint path (22) and coupled by the first and second restraint end fasteners (26)(27) to the corresponding first latch lower anchor (28) and second latch lower anchor (29) allows the child carrier (2) to be disposed in the forward-facing condition (16) (as shown in the examples of FIGS. 3 and 4).

Now referring primarily to FIGS. 1 through 15, embodiments of the inventive child carrier (2) can further include one or more carrier restraint tensioners (3) coupled or removable coupled at a fixed location on the child carrier (2). The term "fixed location" for the purposes of this invention means that the during operation of the carrier restraint tensioner (3) to adjust length of the carrier restraint (4) the child carrier (2) and the carrier restraint tensioner (3) do not move independent of each other. The term "coupled" for the purposes of this invention means a connected regardless of the means of connection between the child carrier (2) and the carrier restraint tensioner (3) including for example mechanical fasteners such as rivets, screws, treaded pins, or the like; flanges engaged in channels (as shown in the examples of FIGS. 11-15); or fabrication, molding, forming, or assembling into one piece, or combinations thereof. The term "removably coupled" for the purposes of this invention means a connection between the child carrier (2) and the carrier restraint tensioner (3) which can be engaged to connect the child carrier (2) to the carrier restraint tensioner and disengaged to disconnect that the child carrier (2) from the carrier restraint tensioner (3) including for example matable parts of a fastener such as a pair of flanges (38)(39) slidably received in corresponding pair of mount channels (40)(41) of a carrier restraint tensioner mount (42) (as shown in the examples of 11, 14, and 15), or the like.

As to particular embodiments, the carrier restraint tensioner (3) coupled or removably coupled at a fixed location on the external surface (8) of the child carrier (2) proximate the first carrier pass through (17) (as shown in the examples of FIGS. 1 and 2) or the second carrier pass through (21) (as shown in the examples of FIGS. 3 and 4) operates to adjust the length of the carrier restraint (4) passed through the first carrier restraint path (18) or the second carrier restraint path (23). As to particular embodiments, the carrier restraint tensioner (3) can be configured to be coupled to a carrier restraint (4) in the form a belt having similar construction to that of a conventional automotive lap seat belt (as shown in the examples of FIGS. 1-15). However, because the inventive child carrier restraint system (1) can be configured to operate in a LATCH environment or similar latching environments, the carrier restraint (4) does not need to be provided in a form similar or the same as an automotive lap seat belt, but rather can take any constructional form compatible with the operation of a particular form of the carrier restraint tensioner (3) such as cord, cable, strap, links, or the like.

Now referring primarily to FIG. 2, a carrier restraint tensioner (3) can be coupled to the external surface (8) of the child carrier (2) at a fixed location such that the carrier restraint (4) passed through the first carrier restraint path (18) can be operably acted upon by the carrier restraint tensioner (3) generating rear-facing directional tension force (43) which draws the carrier seat (9) of child carrier (2) toward the vehicle seat (5) to dispose the child carrier (2) in a secured rear-facing condition (15). The rear-facing directional tension force (43) generated by the configuration of the carrier restraint tensioner (3) being coupled or removable coupled at a fixed location on the child carrier (2) proximate the first carrier pass through (17) between opposed sides of the carrier seat (9) act to reduce net force in the rear-facing condition (15) to oppose movement of the child carrier (2) in relation to the vehicle seat (5).

Now referring primarily to FIG. 4, the carrier restraint tensioner (3) can be coupled to the external surface (8) of the child carrier (2) at a fixed location such that the carrier restraint (4) passed through the second carrier restraint path (22) can be operably acted upon by the carrier restraint tensioner (3) generating forward-facing directional tension force (44) which draws the carrier back (10) of child carrier (2) toward the vehicle seat (5) to dispose the child carrier (2) in a secured forward-facing condition (16). The forward-facing directional tension force (44) generated by the configuration of the carrier restraint tensioner (3) being coupled or removable coupled at a fixed location on the child carrier (2) proximate the second carrier pass through (18) between opposed sides of the carrier back (10) act to reduce net force in the forward-facing condition (16) to oppose movement of the child carrier (2) in relation to the vehicle seat (5).

The term "directional tension force" for the purposes of this invention means the pulling forces of the carrier restraint (4) on the child carrier (2) having directions of force which result from the affirmative selection of a pass through (17) (21) in which to dispose the carrier restraint (4) and affirmative selection of the fixed location of the carrier restraint tensioner (3) on a child carrier (2) which by selection can reduce the net force on a child carrier (2) over a range of operating conditions to avoid or reduce unwanted movement of the child carrier (2) secured to the vehicle seat (5). The structural configurations afforded by affirmative selection of a pass through (17)(21) in which to dispose the carrier restraint (4) and affirmative selection of the fixed location of the carrier restraint tensioner (3) on a child carrier (2) can reduce net force to a value lesser than afforded by conventional car seat restraint devices.

As can be understood from FIGS. 2 and 4, particular embodiments of the child carrier restraint system (1) provide a carrier restraint tensioner (3) that can be coupled at different affirmatively selected fixed locations on the external surface (4) of the child carrier (2) in relation to a first or second carrier pass through (17)(21) which results in affirmative selection of directional tension force (43)(44) on the child carrier (2) in securing the child carrier (2) in relation to the vehicle seat (5).

These selectable configurations of embodiments of the inventive child carrier restraint system (1) overcomes the substantial disadvantage of using conventional seat belt adjustment mechanisms that utilize conventional seat belts as installed by the factory or are retrofitted to the vehicle (6) to secure a conventional child seat. Use of conventional seat belt adjustment mechanisms to secure conventional child car seats may require the use of "belt shortening clips" to take the excess length out of the lap belt otherwise the lap belt will not secure the child car seat in relation to the vehicle seat. This results in the difficulties in installation as above described. To overcome the above described difficulties associated with use of "belt shortening clips", additional belt shortening devices can be applied at a location on the conventional lap belt at a distance from or isolated from the conventional child car seat. The overall dimensions of conventional belt shortening devices may even preclude use proximate the pass through on conventional child car seats.

As one example, U.S. Pat. No. 6,047,451 shows a belt shortening device used to shorten a conventional seat belt in an automobile in an attempt to restrain a conventional child car seat. A substantial disadvantage of this approach is that the belt shortening device is not coupled to the car seat at a fixed location and therefore operates at a distance from the child car seat to shorten the conventional seat belt and tension generated acts in the direction of the seat belt as conventionally installed. As shown for example in FIG. 1 of U.S. Pat. No. 6,047,451, the tension generated in the conventional seat belt acts on the child car seat to pull the child car seat predominantly downward as opposed to back against the vehicle seat. This results in a child car seat which by comparison to the inventive child carrier system (1) can have greater movement in relation to seat belt (forward, backward or rotationally) or the vehicle seat during normal use.

Now referring primarily to FIGS. 1, 3, 11 and 12, as to certain embodiments of the invention, one or more carrier restraint tensioner mounts (42) (also referred to as a "mount" or "mounts") can be fastened at a fixed location on the external surface (8) of the inventive child carrier (2). A mount (42) can be have a fixed location proximate the first carrier restraint pass through (17) or the second carrier restraint pass through (21), or both. Each mount (42) can fixedly or releasably couple a corresponding one of the carrier restraint tensioners (3). Accordingly, a carrier restraint tensioner (3) can be coupled to a first mount (45) proximate the first carrier restraint pass through (17) to allow the child carrier (2) to be disposed in the rear-facing condition (15) and a carrier restraint tensioner (3) can be coupled to a second mount (46) proximate the second carrier restraint pass through (21) to allow the child carrier (2) to be disposed in the forward-facing condition (16).

As to particular embodiments, one carrier restraint tensioner (3) can be configured to selectably removably couple to each of the first mount (45) or the second mount (46) to generate directional tension force (43)(44) in securing the child carrier (2) in the rear-facing condition (15) or the forward-facing condition (16). Now referring primarily to FIGS. 11, 12, and 14, a particular embodiment of the carrier restraint tensioner (3) which removably couples to a mount (42) can include a frame (60) which provides a pair of outwardly projecting flanges (38)(39) which can be slidably received by and removed from a mount (42) having a corresponding pair of mount channels (40)(41) each having an open channel side (47)(48) disposed in inwardly facing opposed relation. As to certain embodiments, the pair of outwardly projecting flanges (38)(39) can be slidably engaged with the corresponding pair of mount channels (40)(41) of the first mount (45) or the second mount (46) to allow the carrier restraint (4) operably coupled to the carrier restraint tensioner (3) to be disposed in the first carrier restraint path (18) or the second carrier restraint path (22). The carrier restraint (4) passed through the first carrier restraint path (18) or the second carrier restraint path (22) and coupled by the first and second restraint end fasteners (23)(24) to the corresponding first and second latch lower anchors (28)(29) allows the child carrier (2) to be disposed in the rear-facing condition (15) (as shown in the example of FIG. 1) or the forward-facing condition (16) (as shown in the example of FIG. 3). As to certain embodiments, the carrier restraint tensioner (3) can be coupled to the first mount (45) or the second mount (46) at a fixed location on the child carrier (2) such that the child carrier (2) and carrier restraint tensioner (3) do not move independently of each other, as above described.

Figure 11:
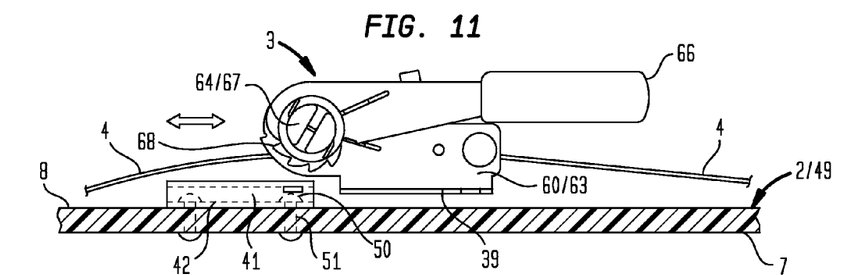
FIG. 11 is a side view of a particular embodiment of carrier restraint tensioner mount having a fixed location on the child carrier which allows removable fixed coupling of the carrier restraint tensioner on the inventive child carrier.
Figure 12:
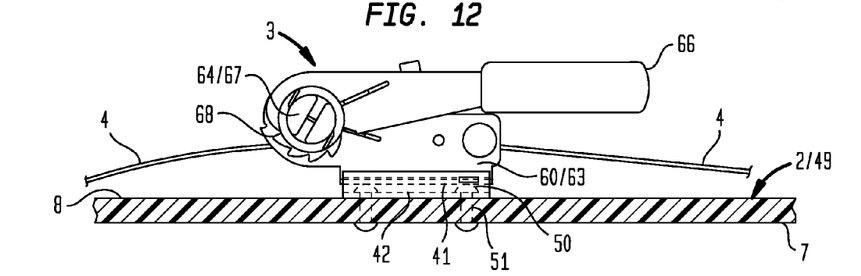
FIG. 12 is a side view of a particular embodiment of a carrier restraint tensioner removably fixedly coupled to the carrier restraint tensioner mount.

Understandably, as to certain embodiments of the inventive child carrier (1), the first mount (45)(or the second mount (46)) can be retrofitted to a conventional child seat (49) by the use of mechanical fasteners (50) to couple the first mount (45)(or the second mount (46)) to the conventional child seat (49) at a fixed location to allow fixed or selectably removably coupling of a carrier restraint tensioner (3). As one example, a pattern of apertures (51) in the first or second mount (45) (46) and a corresponding pattern of apertures (51) in the child carrier (2) allows mechanical fasteners (50) (such as rivets) to fixedly secure the first and second mount (45)(46) to the child carrier (2) (as shown in the examples of FIGS. 11 and 12).

As to certain embodiments, the first mount (45) or the second mount (46) can be one piece with the child carrier (2). The child carrier (2) being molded in a configuration which provides the above described pair of mount channels (40)(41) having the open channel side (47)(48) inwardly facing in opposed relation. Additionally, while the examples of FIGS. 11 and 12 show the first mount (45) in configuration above described; the invention is not so limited, and the first mount (45), the second mount (46) or any one or more mounts (42) can be adapted in any form which fixedly or releasably secures a carrier restraint tensioner (3) for normal operation as described herein.

Figure 10:
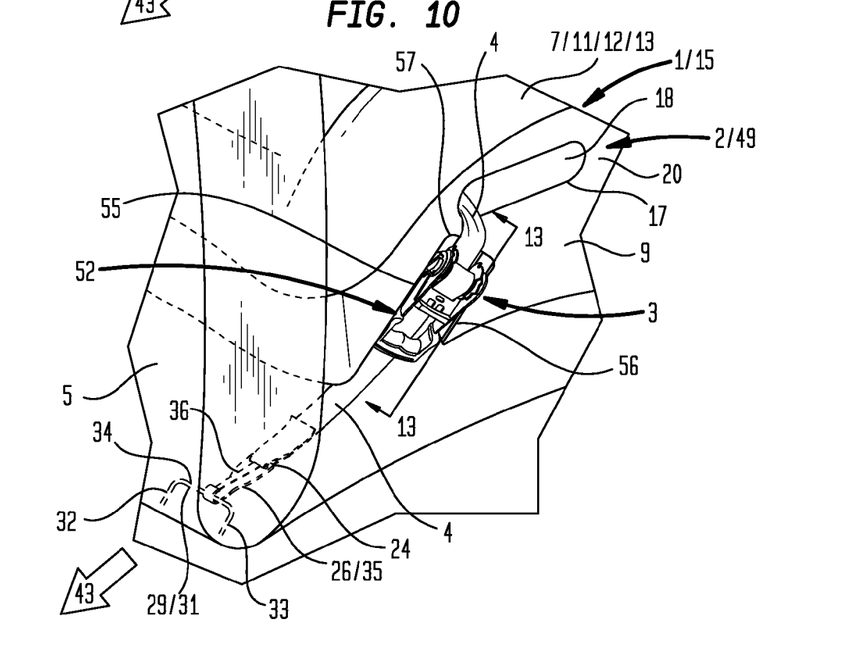
FIG. 10 is an enlarged view of FIG. 9 which shows the carrier restraint tensioner located within the recess element allowing installation of the inventive child carrier in the rear-facing condition.
Figure 13:
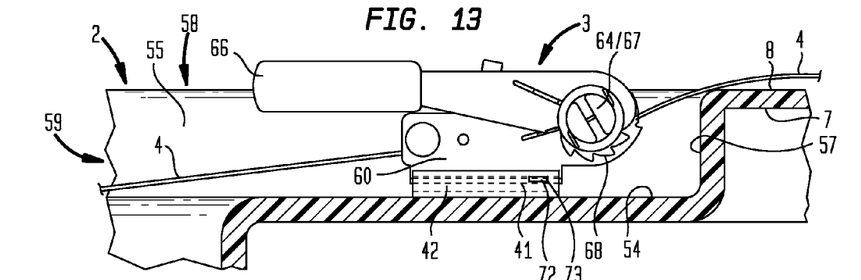
FIG. 13 is a side view of a particular embodiment of the carrier restraint tensioner removably fixedly coupled to the carrier restraint tensioner mount having fixed location within a recess element.
Figure 14:
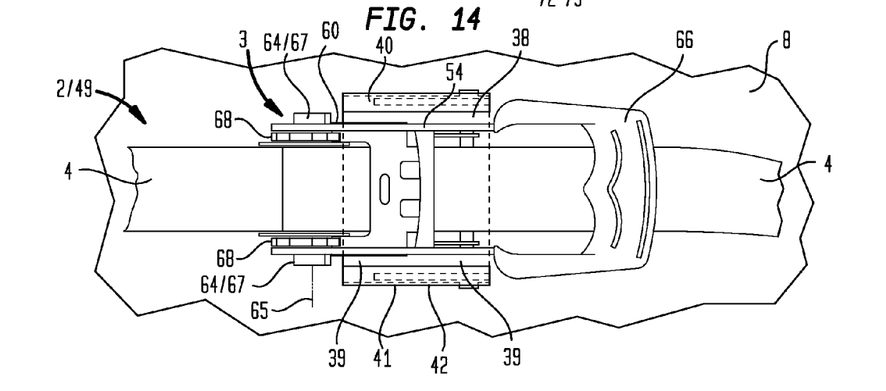
FIG. 14 is a top view of a particular embodiment of the carrier restraint tensioner removably fixedly coupled within the carrier restraint tensioner mount.

Now referring primarily to FIGS. 9, 10, and 13, certain embodiments of the child carrier (2) can further include a first mount recess element (52) or a second mount recess element (53) or both. The first and second mount recess elements (52)(53) can each provide an inward recessed portion of the external surface (8) of the child carrier (2) having a bottom wall (54), a pair of sidewalls (55)(56) and an end wall (57) having an open face (58) and an open end (59). Each of the first and second mount recess elements (52)(53) can be configured or adapted to correspondingly couple the first mount (45) and the second mount (46) to the bottom wall (54). The bottom wall (54), the pair of side walls (55)(56) and the end wall (57) having dimensional relations sufficient to allow a carrier restraint tensioner (3) to pass through the open end (59) to slidably engage the first or the second mounts (45) (46), as above described. The carrier restraint tensioner (3) to be operably disposed within the first mount recess (44) or the second mount recess (45), such that outwardly facing, the carrier restraint tensioner (3) is flush or at a depth lower than external surface (8) of the child carrier (2) surrounding the first mount recess (52) or the second mount recess (53) (as shown in the example of FIG. 13). As to certain embodiments, the child carrier (2) can being molded in a configuration which provides as one piece the first and second mount recess elements (52)(53) each having the above described pair of mount channels (40)(41) having the open channel sides (47) (48) inwardly facing in opposed relation molded or otherwise fabricated as a part of the pair of side walls (55)(56) of each of the first and second mount recess elements (52)(53).

Now referring primarily to FIGS. 11 through 14, embodiments of the carrier restraint tensioner (3) can include a generally channel-shaped frame (60) comprising a bottom wall (61) and opposed frame side walls (62)(63) (or substantially parallel opposed side walls). A carrier restraint winding shaft (64) can be rotationally journaled between the frame side walls (62)(63) for rotation about a rotation axis (65). The carrier restraint (4) can be coupled to the restraint winding shaft (64) such that rotation of the restraint winding shaft (64) results in a corresponding winding of the carrier restraint (4) in layers about the restraint winding shaft (64) to shorten the length of the carrier restraint (4). The restraint winding shaft (64) can operate to sufficiently shorten the carrier restraint (4) to generate sufficient tension to draw the child carrier (2) into secured engagement with the vehicle seat (5) to provide a secured rear-facing condition (7) or secured forward-facing condition (8) of the child carrier (2), as above described.

The carrier restraint winding shaft (64) can be rotated by reciprocal operation of a ratchet handle (66) coupled to one or both shaft ends (67) of the restraint winding shaft (55). The ratchet handle (66) connects to the restraint winding shaft (55) by means of a conventional ratchet mechanism (68) mechanically interposed between. Operation of the ratchet handle (66) in the "wind" direction, locks the ratchet handle (66) to the restraint winding shaft (64) allowing the restraint winding shaft (64) to rotate with respect to the frame (60). Operation of the ratchet handle (66) in the opposite direction locks the restraint winding shaft (64) in relation to the frame (60). The ratchet handle (66) can be operated in the "wind" direction a sufficient number of times to achieve the desired tension in the carrier restraint (4). An illustrative example of a carrier restraint tensioner (3) suitable for use with embodiments of the invention can be a Big Top Ratchet Tie Down, Part No. 358191126; however, the invention is not so limited, and any of a wide and numerous variety of similar mechanisms can be utilized in accordance with the invention to adjust the length of the carrier restraint (4).

Figure 15:
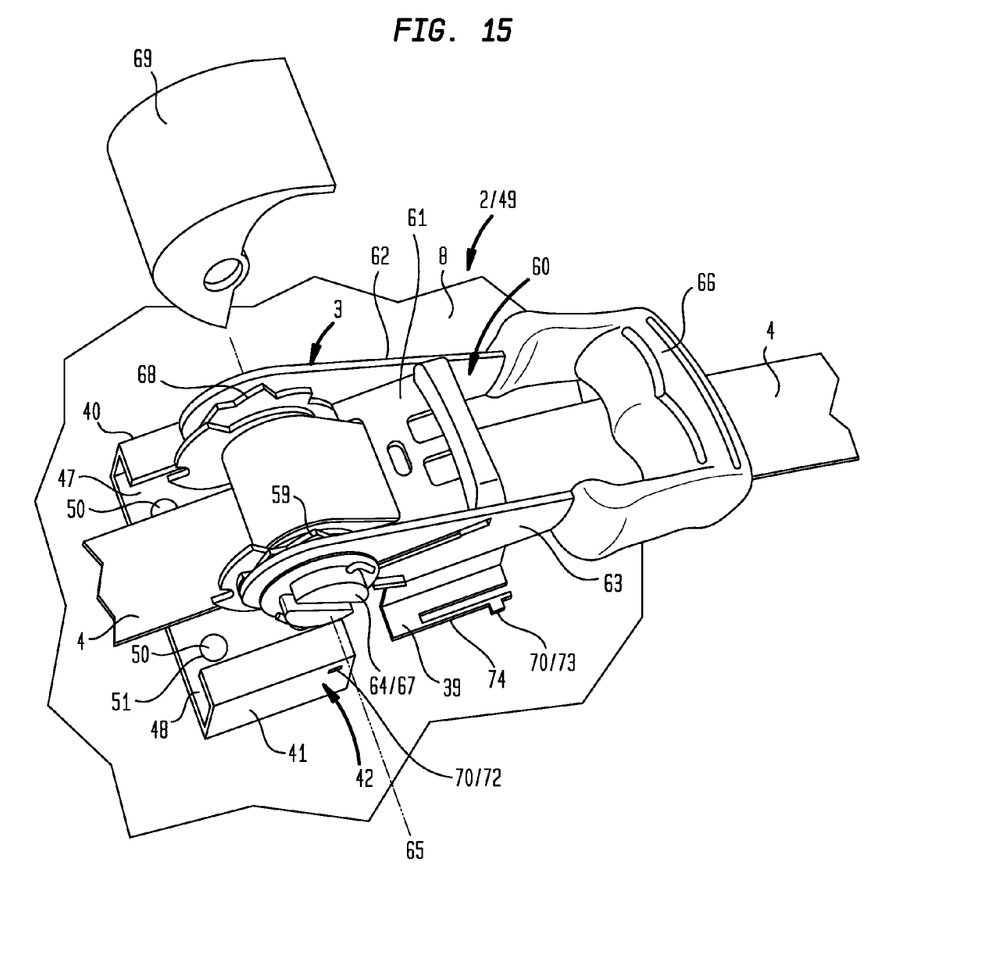
FIG. 15 is a perspective view of a particular embodiment of carrier restraint tensioner mount having a fixed location on the child carrier which allows removable fixed coupling of the carrier restraint tensioner within carrier restraint tensioner mount by operation of a lock element.

Now referring primarily to FIG. 15, particular embodiments of the child carrier (2) include a carrier restraint tensioner (3) having removably fixed coupling to a mount (42) by operation of a matable pair of lock elements (70)(71). While the carrier restraint tensioner (3) shown in FIG. 15, includes the pair of flanges (38)(39) which removably couples to a corresponding pair of mount channels (40)(41) by sliding insertion, as above described, embodiments can further include a first one of the pair of lock elements (70) in the form of an locking aperture (72) and the second one of the pair of lock elements (71) in the form of a locking tab (73). The locking tab (73) can extend outwardly from a resiliently flexible locking member (74) coupled to one of the pair of flanges (38)(39). Sliding insertion of the pair of flanges (38)(39) into the corresponding pair of mount channels (40)(41) flexes the locking member (74) inward allowing sliding engagement of the locking tab (73) along the inside surface of the corresponding on of the pair of mount channels (40)(41). Alignment of the locking tab (73) with the locking aperture (73) allows the locking tab (73) to springly insertingly engage the locking aperture (72) to interrupt sliding insertion of the pair of flanges (38)(39) in the pair of mount channels (40)(41). Forcible inward urging on the locking tab (73) can disengage the locking tab (73) from the locking aperture (73) allowing continued sliding engagement of the pair of flanges (38)(39)

in the pair of mount channels (40)(41) to remove the carrier restraint tensioner (3) from the mount (42). However, this illustrative example is not intended to limit the pair of lock elements (70)(71) to a locking aperture (72) which receives a locking tab (73); but rather is intended to provide sufficient description to allow a person of ordinary skill to make and use a wide variety of lock elements which allow the carrier restraint tensioner (3) to be engaged in fixed locked relation with the mount (42) for operation, as above described, and disengaged by a user as desired.

As can be easily understood from the foregoing, the basic concepts of the present invention may be embodied in a variety of ways. The invention involves numerous and varied embodiments of a child carrier restraint system for a vehicle seat, including the best mode of the invention, and methods of restraining a child carrier in relation to a vehicle seat.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of "a restraint" should be understood to encompass disclosure of the act of "restraining"—whether explicitly discussed or not—and, conversely, were there effectively disclosure of the act of "restraining", such a disclosure should be understood to encompass disclosure of "a restraint" and even a "means for restraining." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment.

Thus, the applicant(s) should be understood to claim at least: i) each of the child carrier restraint devices herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this international PCT patent specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A method of producing a child carrier restraint system, comprising:
   a) providing a carrier restraint tensioner capable of being mounted at a fixed location on a child carrier; and
   b) coupling a carrier restraint to said carrier restraint tensioner, said carrier restraint established in a restraint path locates a carrier restraint first end and a carrier restraint second end at opposed sides of said child carrier, said carrier restraint first and second ends adapted for coupling to corresponding first and second lower latch anchors of a vehicle seat, said carrier restraint tensioner operable to shorten said carrier restraint in said restraint path to secure said child carrier to said vehicle seat.

2. The method of claim 1, further comprising providing a first carrier restraint tensioner mount capable of fixedly coupling to said child carrier, said carrier restraint tensioner removably couples to said first carrier restraint tensioner mount.

3. The method of claim 2, further comprising producing said child carrier and said first carrier restraint tensioner mount as a one piece child carrier and first carrier restraint tensioner mount.

4. The method of claim 3, further comprising disposing a first mount recess in an external surface of said child carrier, fixedly coupling said first carrier restraint tensioner mount inside of said first mount recess, and removably coupling said carrier restraint tensioner to said first carrier restraint tensioner mount coupled inside of said first mount recess.

5. The method of claim 4, further comprising providing a lock element which operates between a locked position and an unlocked position for locking and unlocking said carrier restraint tensioner in relation to said first carrier restraint tensioner mount.

6. The method of claim 5, wherein said carrier restraint tensioner comprises:
a) a generally channel-shaped frame having a bottom wall and opposed frame side walls;
b) a carrier restraint winding shaft rotationally journaled between said opposed frame side walls for rotation about a rotation axis to wind said carrier restraint about said carrier restraint winding shaft;
c) a ratchet coupled to one or both ends of said carrier restraint winding shaft; and
d) a ratchet handle rotatably coupled about one or both ends of said carrier restraint winding shaft to rotate said carrier restraint winding shaft about said rotation axis, said ratchet locks rotation of said carrier restraint winding shaft in relation to said opposed frame side walls as said ratchet handle rotates about said one or both ends of said carrier restraint winding shaft in a first direction, said ratchet handle unlocks rotation of said carrier restraint winding shaft in relation to said opposed frame side walls as said ratchet handle rotates about said one or both ends of said carrier restraint winding shaft in a second direction.

7. The method of claim 6, wherein said first carrier restraint tensioner mount includes a pair of mount channels disposed in opposed relation to correspondingly receive a pair of flanges outwardly projecting from said channel-shaped frame of said carrier restraint tensioner.

8. The method of claim 5, further comprising providing a second carrier restraint tensioner mount capable of fixedly coupling to said child carrier, said carrier restraint tensioner removably couples to said second carrier restraint tensioner mount.

9. The method of claim 8, further comprising producing said child carrier and said second carrier restraint tensioner mount as a one piece child carrier and second carrier restraint tensioner mount.

10. The method of claim 9, further comprising disposing a second mount recess in an external surface of said child carrier, fixedly coupling said second carrier restraint tensioner inside of said second mount recess, and removably coupling said carrier restraint tensioner to said second carrier restraint tensioner mount coupled inside of said second mount recess.

11. The method of claim 10, further comprising providing a lock element which operates between a locked position and an unlocked position for locking and unlocking said carrier restraint tensioner in relation to said second carrier restraint tensioner mount.

12. The method of claim 11, wherein said carrier restraint tensioner comprises:
a) a generally channel-shaped frame having a bottom wall and opposed frame side walls;
b) a carrier restraint winding shaft rotationally journaled between said opposed frame side walls for rotation about a rotation axis to wind said carrier restraint about said carrier restraint winding shaft;
c) a ratchet coupled to one or both ends of said carrier restraint winding shaft; and
d) a ratchet handle rotatably coupled about one or both ends of said carrier restraint winding shaft to rotate said carrier restraint winding shaft about said rotation axis, said ratchet locks rotation of said carrier restraint winding shaft in relation to said opposed frame side walls as said ratchet handle rotates about said one or both ends of said carrier restraint winding shaft in a first direction, said ratchet handle unlocks rotation of said carrier restraint winding shaft in relation to said opposed frame side walls as said ratchet handle rotates about said one or both ends of said carrier restraint winding shaft in a second direction.

13. The method of claim 12, wherein each of said first and second carrier restraint tensioner mounts includes a pair of mount channels disposed in opposed relation to correspondingly receive a pair of flanges outwardly projecting from said channel-shaped frame of said carrier restraint tensioner.

14. The method of claim 1, further comprising mounting said carrier restraint tensioner at said fixed location on said child carrier having at least one child carrier pass-through which defines said restraint path between said opposed sides of said child carrier.

15. The method of claim 14, wherein said at least one pass-through comprises a first pass-through which defines a first restraint path communicating between said opposed sides of said child carrier, said carrier restraint established in said first restraint path to locate said carrier restraint first end and said carrier restraint second end each proximate a corresponding one of said opposed sides of said child carrier, said carrier restraint first and second ends coupled to said corresponding first and second lower latch anchors of said vehicle seat secure said child carrier to said vehicle seat in a rearward-facing condition.

16. The method of claim 15, further comprising:
a) disposing a carrier seat first bypass to provide said first restraint path which communicates between said opposed sides of said child carrier; and
b) coupling said carrier restraint tensioner at said fixed location on said child carrier proximate said carrier seat first bypass, wherein said carrier restraint coupled to said carrier restraint tensioner allows said carrier restraint disposed in said first restraint path to locate said carrier restraint first and second ends on said opposed sides of said child carrier for coupling to said corresponding first and second lower latch anchors of said vehicle seat to position said child carrier in said rearward-facing condition, whereby operation of said carrier restraint tensioner to shorten said carrier restraint generates rearward-facing directionally tensioned forces which reduce net force on said child carrier in said rearward-facing condition.

17. The method of claim 16, wherein said at least one pass-through comprises a second pass-through which defines a second restraint path communicating between said opposed sides of said child carrier, said carrier restraint established in said second restraint path to locate said carrier restraint first end and said carrier restraint second end each proximate a corresponding one of said opposed sides of said child carrier, said carrier restraint first and second ends coupled to said corresponding first and second lower latch anchors of said vehicle seat secure said child carrier to said vehicle seat in a forward-facing condition.

18. The method of claim 17, further comprising:
   a) disposing a carrier seat second bypass to provide said second restraint path which communicates between said opposed sides of said child carrier; and
   b) coupling said carrier restraint tensioner at said fixed location on said child carrier proximate said carrier seat second bypass, wherein said carrier restraint coupled to said carrier restraint tensioner allows said carrier restraint disposed in said second restraint path to locate said carrier restraint first and second ends on said opposed sides of said child carrier for coupling to said corresponding first and second lower latch anchors of said vehicle seat to position said child carrier in said forward-facing condition, whereby operation of said carrier restraint tensioner to shorten said carrier restraint generates forward-facing directionally tensioned forces which reduce net force on said child carrier in said forward-facing condition.

\* \* \* \* \*